United States Patent
Tsirkin

(10) Patent No.: US 10,459,747 B2
(45) Date of Patent: Oct. 29, 2019

(54) EXITLESS TIMER ACCESS FOR VIRTUAL MACHINES

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

(*) Notice: Subject to any disclaimer, the term of this patent is extended or adjusted under 35 U.S.C. 154(b) by 136 days.

(21) Appl. No.: 15/201,947

(22) Filed: Jul. 5, 2016

(65) Prior Publication Data
US 2018/0011733 A1 Jan. 11, 2018

(51) Int. Cl.
G06F 9/455 (2018.01)
G06F 9/46 (2006.01)
G06F 9/48 (2006.01)

(52) U.S. Cl.
CPC .......... *G06F 9/45558* (2013.01); *G06F 9/455* (2013.01); *G06F 9/45533* (2013.01); *G06F 9/461* (2013.01); *G06F 9/48* (2013.01); *G06F 9/4806* (2013.01); *G06F 9/4812* (2013.01); *G06F 9/4825* (2013.01); *G06F 9/4837* (2013.01); *G06F 9/4843* (2013.01); *G06F 9/4881* (2013.01); *G06F 2009/4557* (2013.01); *G06F 2009/45579* (2013.01)

(58) Field of Classification Search
CPC .... G06F 9/455; G06F 9/45533; G06F 9/4558; G06F 2009/45579; G06F 9/48; G06F 9/4806; G06F 9/4812; G06F 9/4825; G06F 9/4837; G06F 9/4843; G06F 9/4881; G06F 9/461
See application file for complete search history.

(56) References Cited

U.S. PATENT DOCUMENTS

| 6,550,015 B1 | 4/2003 | Craycraft et al. |
| 7,475,002 B1 | 1/2009 | Mann |
| 8,146,078 B2 | 3/2012 | Bennett et al. |

(Continued)

FOREIGN PATENT DOCUMENTS

CN 102541616 A 7/2012

OTHER PUBLICATIONS

Tu et al, "A Comprehensive Implementation and Evaluation of Direct Interrupt Delivery", Mar. 14-15, 2015, ACM, pp. 1-15.*

(Continued)

*Primary Examiner* — Charles M Swift
(74) *Attorney, Agent, or Firm* — K&L Gates LLP

(57) ABSTRACT

A system and method of scheduling timer access includes a first physical processor with a first physical timer executing a first guest virtual machine. A hypervisor determines an interrupt time remaining before an interrupt is scheduled and determines the interrupt time is greater than a threshold time. Responsive to determining that the interrupt time is greater than the threshold time, the hypervisor designates a second physical processor as a control processor with a control timer and sends, to the second physical processor, an interval time, which is a specific time duration. The hypervisor grants, to the first guest virtual machine, access to the first physical timer. The second physical processor detects that the interval time expires. Responsive to detecting that the interval time expired, an inter-processor interrupt is sent from the second physical processor to the first physical processor, triggering the first guest virtual machine to exit to the hypervisor.

20 Claims, 6 Drawing Sheets

(56) References Cited

U.S. PATENT DOCUMENTS

| | | | |
|---|---|---|---|
| 8,539,010 B2 | 9/2013 | Inakoshi | |
| 8,832,688 B2 | 9/2014 | Tang et al. | |
| 8,892,802 B2 | 11/2014 | Amit et al. | |
| 2003/0110336 A1* | 6/2003 | Park | G06F 13/24 710/260 |
| 2006/0075402 A1* | 4/2006 | Neiger | G06F 9/45558 718/1 |
| 2008/0126820 A1* | 5/2008 | Fraser | G06F 1/12 713/375 |
| 2008/0184227 A1* | 7/2008 | Matsumoto | G06F 9/45533 718/1 |
| 2009/0049220 A1* | 2/2009 | Conti | G06F 13/24 710/267 |
| 2012/0117564 A1* | 5/2012 | Friebel | G06F 9/45541 718/1 |
| 2012/0233487 A1* | 9/2012 | Okano | G06F 1/14 713/400 |
| 2013/0125118 A1* | 5/2013 | Niesser | G06F 9/455 718/1 |
| 2013/0174148 A1* | 7/2013 | Amit | G06F 9/45558 718/1 |
| 2013/0218549 A1 | 8/2013 | Sultan et al. | |
| 2014/0282502 A1* | 9/2014 | Natu | G06F 9/45533 718/1 |
| 2014/0359608 A1* | 12/2014 | Tsirkin | G06F 9/485 718/1 |
| 2016/0072883 A1* | 3/2016 | Long | H04L 67/1095 709/219 |

OTHER PUBLICATIONS

Timekeeping in VMware Virtual Machines, https://www.vmware.com/files/pdf/Timekeeping-In-VirtualMachines.pdf.

Grosser Beleg & Meike Zehlike, Time Virtualization in Nova and Vancouver, Feb. 22, 2013, Technical University Dresden, http://os.inf.tu-dresden.de/papers_ps/zehlike-beleg.pdf.

Thomas Molgaard, A Few Words on the ARM Ecosystem, Director of Software Marketing Systems & Software Group, http://events.linuxfoundation.org/sites/events/files/slides/xds15_0.pdf.

Mazen Ezzeddine, Physical/Virtual Timer in a Virtualized ARM Environment, Aug. 13, 2014, https://community.arm.com/thread/6401?db=5.

* cited by examiner

EXITLESS TIMER ACCESS FOR VIRTUAL MACHINES

BACKGROUND

The present disclosure relates generally to timer access for guest virtual machines. Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor. Accordingly, timer access for guest virtual machines may be managed by the hypervisor so that guest virtual machines can access hardware timers at appropriate times or in scheduled time slots.

SUMMARY

The present disclosure provides new and innovative methods and systems for scheduling timer access. An example method includes executing, by a first physical processor with a first physical timer, a first guest virtual machine. A hypervisor determines an interrupt time. The interrupt time is a time remaining before an interrupt is scheduled to occur. The hypervisor determines that the interrupt time is greater than a threshold time. Responsive to determining that the interrupt time is greater than the threshold time, the hypervisor designates a second physical processor with a second physical timer as a control processor with a control timer. The hypervisor sends an interval time to the second physical processor. The interval time is a specific time duration provided to the second physical timer. The hypervisor grants, to the first guest virtual machine, access to the first physical timer. The second physical processor detects that the interval time expires on the second physical timer. Responsive to detecting that the interval time expired, an inter-processor interrupt is sent from the second physical processor to the first physical processor. The inter-processor interrupt triggers the first guest virtual machine to exit to the hypervisor.

Additional features and advantages of the disclosed methods and system are described in, and will be apparent from, the following Detailed Description and the Figures.

DETAILED DESCRIPTION OF EXAMPLE EMBODIMENTS

Figure 1:
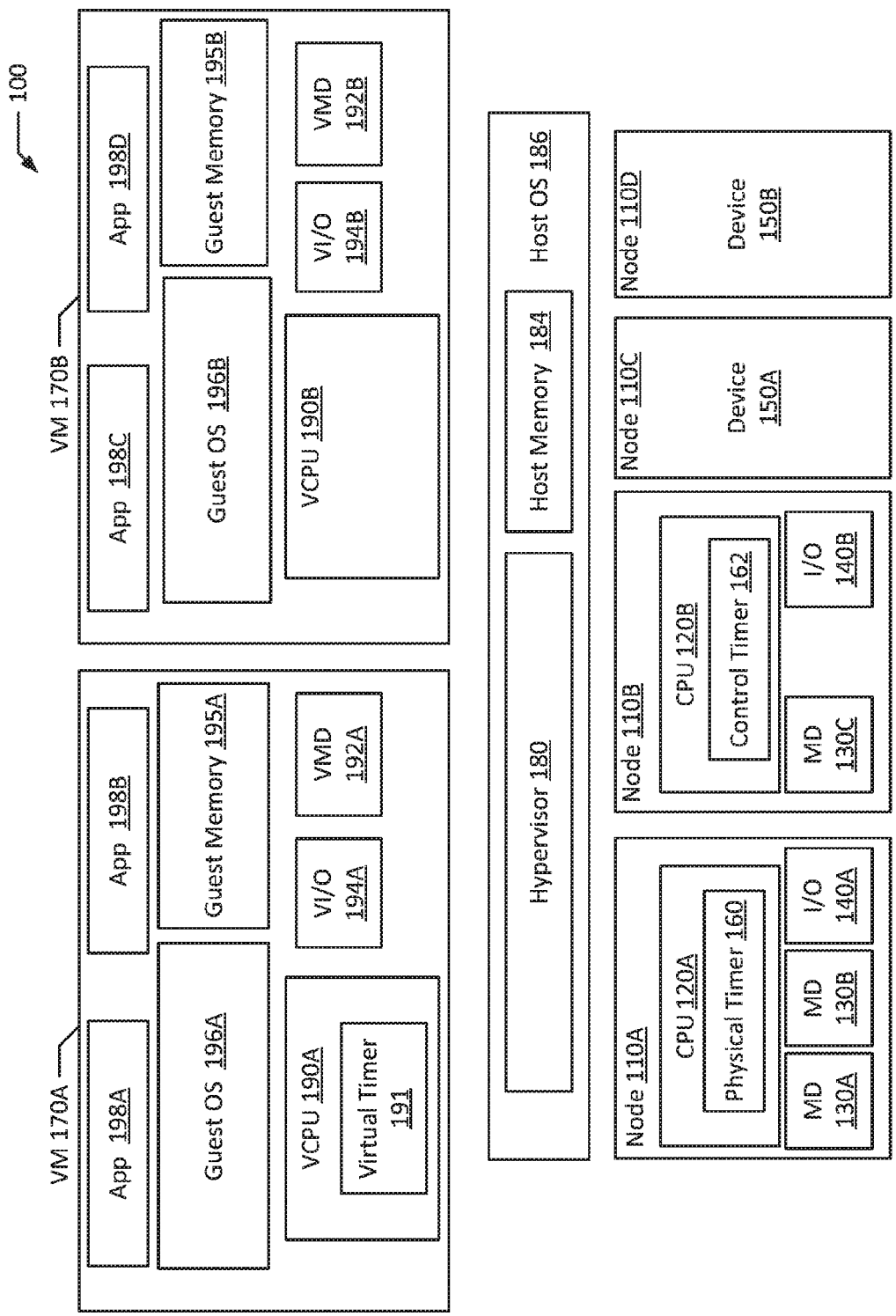
FIG. 1 is a block diagram of an example multi-processor computer system according to an example embodiment of the present disclosure.

In computer systems executing guest virtual machines, each of the guest virtual machines (e.g., a first guest virtual machine and a second guest virtual machine) may require a particular allocation of resources. For example, each of the guest virtual machines may require access and/or interaction with a physical processor (e.g., to perform computing functions). A hypervisor may schedule virtual machine exits, such that each guest virtual machine may use computing resources for particular periods of time, for particular computing functions, etc. By scheduling virtual machine exits, the hypervisor may attempt to ensure that computing resources are properly allocated among a number of virtual machines. Inefficient allocation of resources, such as computing resources, may be a significant source of virtualization overhead.

Moreover, virtual machine exits may allow for the transfer of computing resources from one guest virtual machine to another guest virtual machine. For example, the first guest virtual machine may be utilizing computing resources (e.g., accessing a physical processor to perform computing functions). The second guest virtual machine may, likewise, require computing resources (e.g., require access to the physical processor, which is being accessed by the first guest virtual machine). In order to transfer computing resources from one guest virtual machine to another guest virtual machine (e.g., remove/grant physical processor access), the virtual machine utilizing computing resources may stop performing computing functions and exit to the hypervisor. Virtual machine exits are typically another significant source of virtualization overhead.

Additionally, in typical configurations, a timer is used for tracking physical processor use (e.g., determining how long a guest virtual machine has access to the processor). Thus, timers may help with ensuring proper allocation of computing resources. However, if the timer used to track and evaluate physical processor use is managed by the physical processor itself, the timer may not perform a desired function of a guest virtual machine. For example, if the first guest virtual machine has access to the first physical processor including the timer on the first physical processor, the first guest virtual machine may utilize that timer to perform any particular computing functions. While being used to perform particular computing functions, as dictated by the first guest virtual machine, the timer may be unable to simultaneously perform other timing functions. For example, the timer may be unable to simultaneously (1) perform computing functions as dictated by the first guest virtual machine and (2) performing timing functions regarding timing the usage of the first physical processor by the first guest virtual machine. In this particular example, it may be the case that the first guest virtual machine will have unlimited access to the first physical processor, because the first guest virtual machine is given complete control over the first physical timer; the first physical timer is unable to perform timing functions, such as processor usage scheduling, because it is being used exclusively by the first guest virtual machine.

By determining when scheduled virtual machine exits (e.g., housekeeping tasks) will occur, the hypervisor can more efficiently allocate computing resources. Likewise, by providing for exitless timer access, greater access to a physical processor (e.g., the physical processor and the physical timer associated with the physical processor) may be granted to individual guest virtual machines. Providing for exitless timer access will typically include designation of timer responsibilities to a control processor with a control timer, such that the individual guest virtual machine may utilize the physical processor and the physical timer in ways that may not be allowed without the use of exitless timer access. Thus, exitless timer access both reduces virtualization overhead and improves computing performance of virtualization computing systems. The present disclosure describes advantageous systems and methods for scheduling timer access, optimizing virtual machine exits, and reducing virtualization overhead.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-B) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-B refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-B may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-B, MD 130A-C, I/O 140A-B, a software device, and/or hardware device 150A-B.

Processors 120A-B additionally include physical timers. For example, processor 120A includes physical timer 160. Likewise, for example, processor 120B includes control timer 162. The physical timer 160 and the control timer 162 may have the same or substantially the same level of precision. In an example embodiment, each of the physical timer 160 and the control timer 162 may be a high-precision timer (e.g., 10 MHz). Although, for example, the processor 120A may include a high-precision timer (e.g., 10 MHz) and a low-precision timer (e.g., 10 kHz), the low-precision timer may be unsuitable for use as a control timer 162, since a low-precision timer is typically not precise enough to properly maintain scheduled time slots and/or scheduled exits.

As noted above, computer system 100 may run multiple guest virtual machines (e.g., VM 170A-B), by executing a software layer (e.g., hypervisor 180) above the hardware and below the guest virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the host operating system 186. In another example embodiment, the hypervisor 180 may run directly on the computer system 100 without an operating system beneath it. For example, the hypervisor 180 may run directly on computer system 100, without host operating system 186 or host memory 184. The hypervisor 180 may virtualize the physical layer, including processors, memory, and I/O devices, and present this virtualization to guest virtual machines 170A-B as devices, including virtual processors (e.g., VCPU 190A-B), virtual memory devices (e.g., VMD 192A-B), and/or virtual I/O devices (e.g., VI/O 194A-B). Virtual processors (e.g., VCPU 190A) further include virtual timers (e.g., virtual timer 191).

A guest virtual machine 170A-B may run on any type of dependent, independent, compatible, and/or incompatible applications on the underlying hardware and OS 186. In an example embodiment, applications (e.g., App 198A-D) run on a guest virtual machine 170A-B may be dependent on the underlying hardware and/or OS 186. In another example embodiment, applications 198A-D run on guest virtual machine 170A-B may be independent of the underlying hardware and/or OS 186. For example, applications 198A-B run on a first guest virtual machine 170A may be dependent on the underlying hardware and/or OS 186 while applications 198C-D run on a second guest virtual machine 170B are independent of the underlying hardware and/or OS 186. Additionally, applications 198A-D run on guest virtual machine 170A-B may be compatible with the underlying hardware and/or OS 186. In an example embodiment, applications 198A-D run on a guest virtual machine 170A-B may be incompatible with the underlying hardware and/or OS 186. For example, applications 198A-B run on one guest virtual machine 170A may be compatible with the underlying hardware and/or OS 186 while applications 198C-D run on another guest virtual machine 170B are incompatible with the underlying hardware and/or OS 186. In an example embodiment, a device may be implemented as a guest virtual machine 170A-B.

In an example embodiment, a guest virtual machine 170A-B may execute a guest operating system (guest OS) 196A-B, which may utilize the underlying VCPU 190A-B, VMD 192A-B, and VI/O devices 194A-B. One or more applications 198A-D may be running on a guest virtual machine 170A-B under the guest operating system 196A-B. In an example embodiment, a guest virtual machine 170A-B may include multiple virtual processors 190A-B. Processor virtualization may be implemented by the hypervisor 180 scheduling time slots on one or more physical processors 120A-B such that, from the guest operating system's perspective, those time slots are scheduled on a virtual processor 190A-B. Scheduling time slots, management of scheduled time slots, and related timer management is discussed in greater detail herein with reference to FIGS. 2-4.

The hypervisor 180 controls and limits access to memory (e.g., memory allocated to the guest virtual machines 170A-B and memory allocated to the guest operating systems 196A-B, such as guest memory 195A-B provided to guest operating systems 196A-B, etc.). For example, guest memory 195A-B may be divided into a plurality of memory pages. Access to these memory pages is controlled and limited by the hypervisor 180. For example, mappings to memory are managed by the hypervisor 180. Through these mappings, the memory itself can be accessed. Likewise, mappings may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL® Extended Memory 64 Technology mode, etc.). Likewise, for example, guest memory 195A-B allocated to the guest operating system 196A-B are mapped from host memory 184 such that when a guest application 198A-D or a device (e.g., device 150A) uses or accesses a memory page of guest memory 195A-B it is actually using or accessing host memory 184. Host memory 184 may also be referred to as host physical memory 184, as host physical memory 184 may physically exist on physical hardware of a computer system (e.g., system 100).

FIGS. 2A-D are block diagrams of an example timer access according to an example embodiment of the present disclosure. For example, as illustrated by FIGS. 2A-D, processor 120A includes physical timer 160. Likewise, for example, processor 120B includes control timer 162.

Figure 2A:
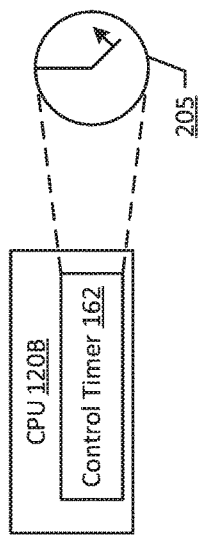
FIGS. 2A-D are block diagrams of an example timer access according to an example embodiment of the present disclosure.

FIG. 2A illustrates a first timer configuration. In the first timer configuration, the physical processor 120B is designated, by the hypervisor 180, as the control processor with control timer 162. In an example embodiment, designating the physical processor 120B as the control processor reduces virtualization overhead. Upon designation, an interval time 205 has been sent to the physical processor 120B. The interval time 205 is a specific time duration (e.g., one-half millisecond). In an example embodiment, the interval time 205 is expiring on the control timer 162, and prior to the interval time 205 expiring on the control timer 162, the guest virtual machine 170A is granted access to the physical timer 160 on the physical processor 120A (as illustrated by the link defined by arrow 210). For example, the guest virtual machine 170A has access to use the physical processor 120A, including use of the physical timer 160 to perform computing functions.

Figure 2B:
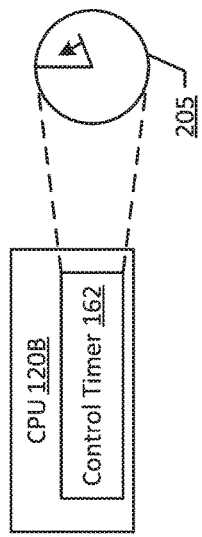

FIG. 2B illustrates a second timer configuration. In the second timer configuration, the interval time 205 is still not yet expired on the control timer 162 (e.g., the interval time 205 remaining is one-quarter millisecond). Likewise, because the interval time 205 has still not yet expired on the control timer 162, the guest virtual machine 170A still has access to the physical timer 160 on the physical processor 120A (as illustrated by the link defined by arrow 210).

Figure 2C:
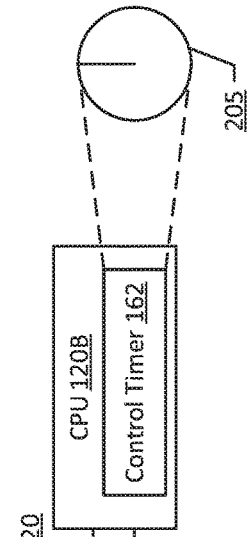

FIG. 2C illustrates a third timer configuration. In the third timer configuration, the interval time 205 has expired on the control timer 162 (e.g., the interval time 205 remaining is zero). Responsive to the interval time 205 expiring on the control timer 162, the physical processor 120B sends an inter-processor interrupt 215 to the physical processor 120A (block 220). The inter-processor interrupt 215 is configured to cause the guest virtual machine 170A to exit to the hypervisor 180, such that the guest virtual machine 170A no longer has access to the physical processor 120A and the physical timer 160. For example, the inter-processor interrupt 215 is configured to cut timer access (as illustrated by the link defined by arrow 210).

Figure 2D:
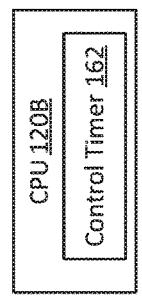

FIG. 2D illustrates a fourth timer configuration. In the fourth timer configuration, the guest virtual machine 170A has exited to the hypervisor 180. For example, the guest virtual machine 170A no longer has access to the physical timer 160 on the physical processor 120A.

Figure 3A:
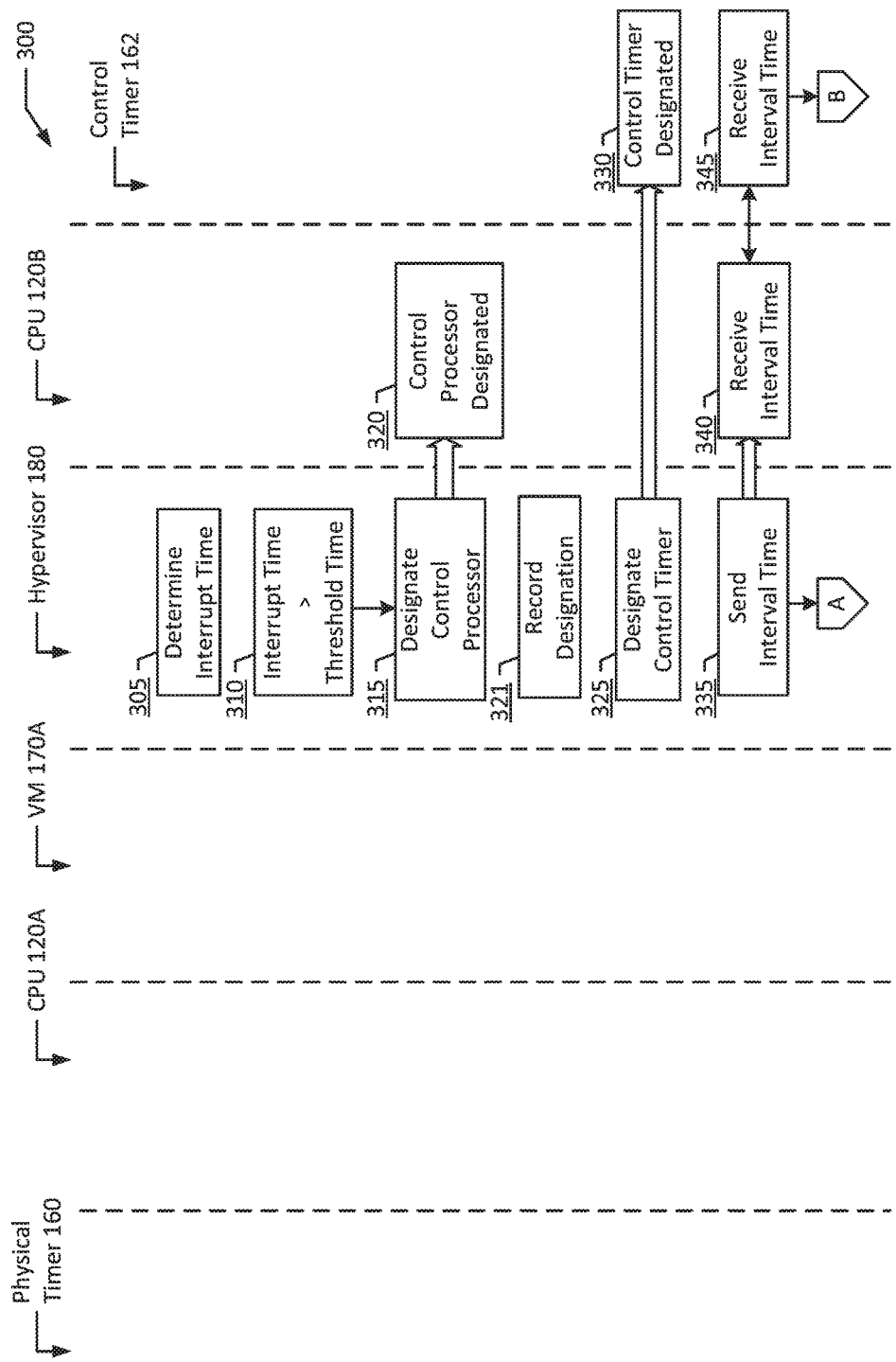
FIGS. 3A-B are a flow diagram illustrating scheduling timer access according to an example embodiment of the present disclosure.
Figure 3B:
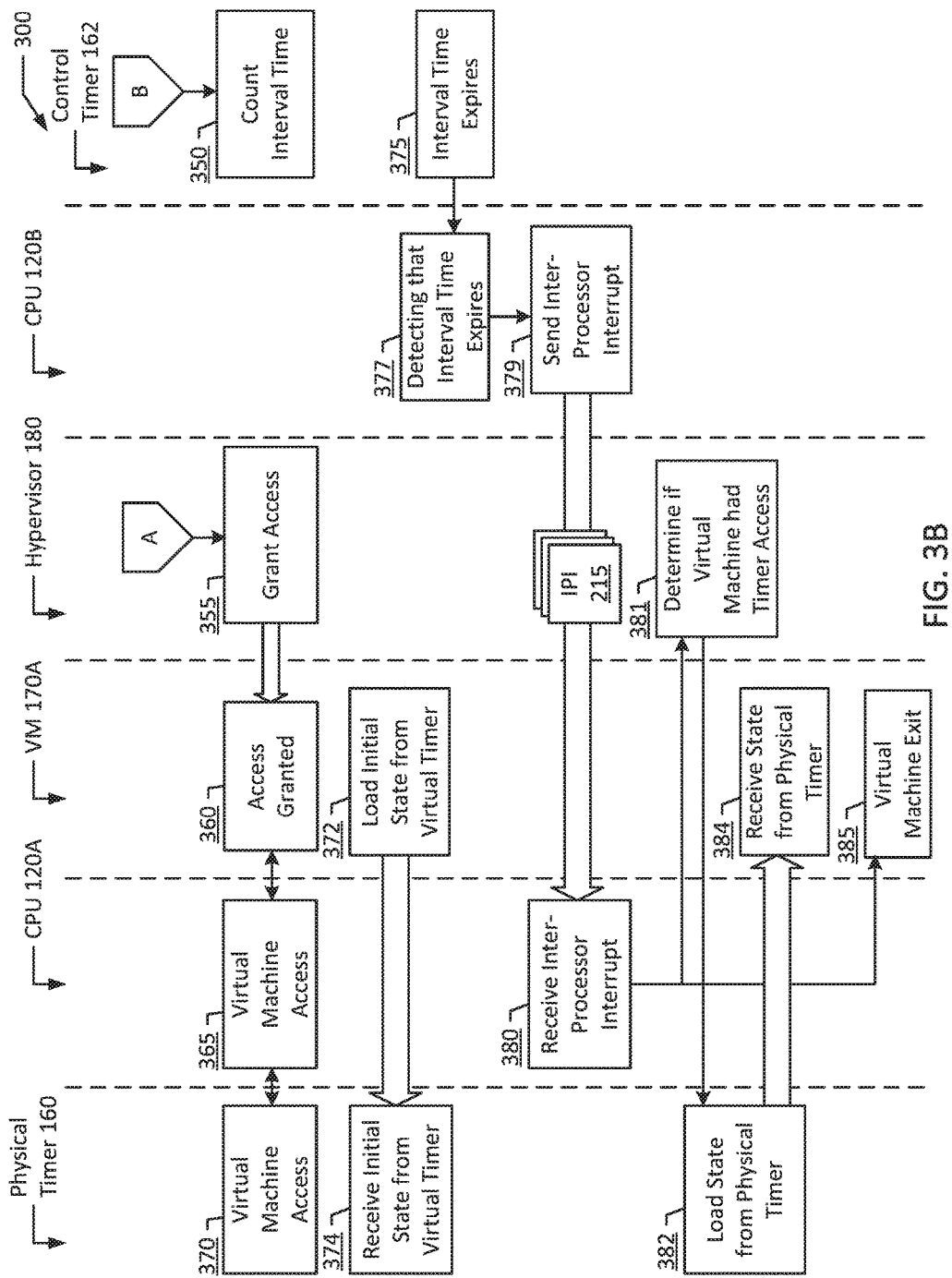

FIGS. 3A-B are a flow diagram illustrating scheduling timer access according to an example embodiment of the present disclosure. Although the example method 300 is described with reference to the flow diagram illustrated in FIGS. 3A-B, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. In an example embodiment, the method is performed by a hypervisor 180 interacting with processors 120A-B and guest virtual machine 170A.

In the illustrated example embodiment in FIG. 3A, the hypervisor 180 determines an interrupt time (block 305). The interrupt time is a time remaining before an interrupt is scheduled to occur. For example, the interrupt time may be two milliseconds (e.g., an interrupt is scheduled to occur in two milliseconds). The interrupt time 205 may be scheduled by computer system 100. In an example embodiment, the interrupt time is a scheduled time associated with maintenance for hypervisor 180 (e.g., housekeeping tasks). For example, virtualization maintenance may be scheduled by a processor (e.g., CPU 120A), a hypervisor (e.g., hypervisor 180), an operating system (e.g., host operating system 186), a guest virtual machine (e.g., VM 170A), etc. In an example embodiment, hypervisor maintenance is performed for memory compaction (e.g., moving memory around for efficiency, rearranging the physical memory disk, etc.). In an example embodiment, hypervisor maintenance is performed for management tasks (e.g., information/commands received from a management system, status updates, etc.). In a different example embodiment, the interrupt time is a scheduled time associated with a different second guest virtual machine requiring access to the first physical processor. For example, when a guest virtual machine 170A has access to the physical processor 120A and/or has access to the physical timer 160, a different guest virtual machine 170B may be unable to access the physical processor 120A and the first physical timer 160. Thus, the different guest virtual machine 170B will schedule an interrupt time, such that it will be able to access the physical processor 120A and the physical timer 160 at the interrupt time.

Then, for example, the hypervisor 180 determines that the interrupt time is greater than a threshold time (block 310). For example, the threshold time is one millisecond (e.g., the two millisecond interrupt time is greater than the one millisecond threshold time). In an example embodiment, the threshold time is pre-programmed. In an alternate example embodiment, the threshold time is provided by computer system 100 and/or and external computer system. Implementation of a threshold time determination (e.g., block 310) ensures that timer designation as described herein is not unnecessarily performed when a scheduled interrupt (e.g., interrupt time) is about to occur in the relatively near future.

Responsive to determining that the interrupt time (e.g., two milliseconds) is greater than the threshold time (e.g., one millisecond), the hypervisor 180 designates a control processor (block 315). For example, the physical processor 120B is designated as the control processor (block 320). In an example embodiment, the hypervisor 180 records that physical processor 120B is designated as the control processor (block 321). In a related example embodiment, a flag is used to record that physical processor 120B is designated as the control processor. In an example embodiment, designating the physical processor 120B as the control processor reduces virtualization overhead. Additionally, responsive to determining that the interrupt time is greater than the threshold time, the hypervisor 180 designates a control timer (block 325). For example, the physical timer 162 is designated as the control timer (block 330).

The hypervisor 180 sends, to the physical processor 120B, an interval time 205 (block 335). For example, the interval time 205 is one-half millisecond. The interval time 205 is received by the physical processor 120B (block 340) and is subsequently provided to the control timer 162, which receives the interval time 205 (block 345).

Continuing on to FIG. 3B, the control timer 162 counts or clocks the interval time 205 (block 350). For example, the control timer 162 begins a timer of a duration equivalent to the interval time 205 (e.g., one-half millisecond), and waits for the interval time 205 to expire. Interval time 205 expiration is described, in greater detail, with reference to FIG. 2 above. When the control timer 162 starts counting the interval time 205, the hypervisor 180 grants access (block 355) to the guest virtual machine 170A (block 360). By granting access (blocks 355 and 360), the guest virtual machine 170A has access to the physical processor 120A (block 365). For example, a guest virtual machine 170A may perform computing functions utilizing the physical processor 120A. Likewise, by granting access (blocks 355 and 360), the guest virtual machine 170A has access to the physical timer 160 (block 370). For example, the guest virtual machine 170A may perform computing functions utilizing the physical timer 160. So long as the interval time 205 has not expired, the first guest virtual machine 170A has access to the first physical processor 120A (block 365) and the first physical timer 160 (block 370). In an example embodiment, an initial state of the physical timer 160 is loaded, from a virtual timer 191 on the guest virtual machine 170A (block 372). The initial state, from the virtual timer 191, is received by the physical timer 160 (block 374). For example, the initial state of the physical timer 160 is derived from the state of the virtual timer 191. The hypervisor 180 waits for the interval time 205 to expire on the control timer 162.

Eventually the interval time 205 expires on the control timer 162 (block 375). The physical processor 120B detects that the interval time 205 expires (block 377). Responsive to detecting that the interval time 205 expired, the physical processor sends an inter-processor interrupt 215 to the physical processor 120A (block 379). Sending of the inter-processor interrupt 215 is described, in greater detail, with reference to FIG. 2 above. Then, the inter-processor interrupt 215 is received at physical processor 120A (block 380). The inter-processor interrupt 215 triggers a virtual machine exit (block 385). For example, the inter-processor interrupt 215 causes the guest virtual machine 170A to exit to the hypervisor 180. By exiting to the hypervisor 180, the guest virtual machine 170A no longer has access to perform computing functions on the physical processor 120 and/or the physical timer 160.

In an example embodiment, responsive to the physical processor 120A receiving the inter-processor interrupt 215 from the physical processor 120B, the hypervisor 180 determines whether access to the physical timer 160 was granted to the guest virtual machine 170A when the inter-processor interrupt 215 was received at the physical processor 120A (block 381). In a related example embodiment, responsive to determining that access to the physical timer 160 was granted to the guest virtual machine 170A when the inter-processor interrupt 215 was received, the hypervisor 180 loads a state of the physical timer 160 into the virtual timer 191 on the guest virtual machine 170A (block 382). The state, from the physical timer 160, is received by the guest virtual machine 170A (block 384). For example, if there was time remaining on the physical timer 160, the hypervisor 180 may install a timer handler, to forward the time remaining onto the virtual timer 191 on the guest virtual machine 170A.

Figure 4:
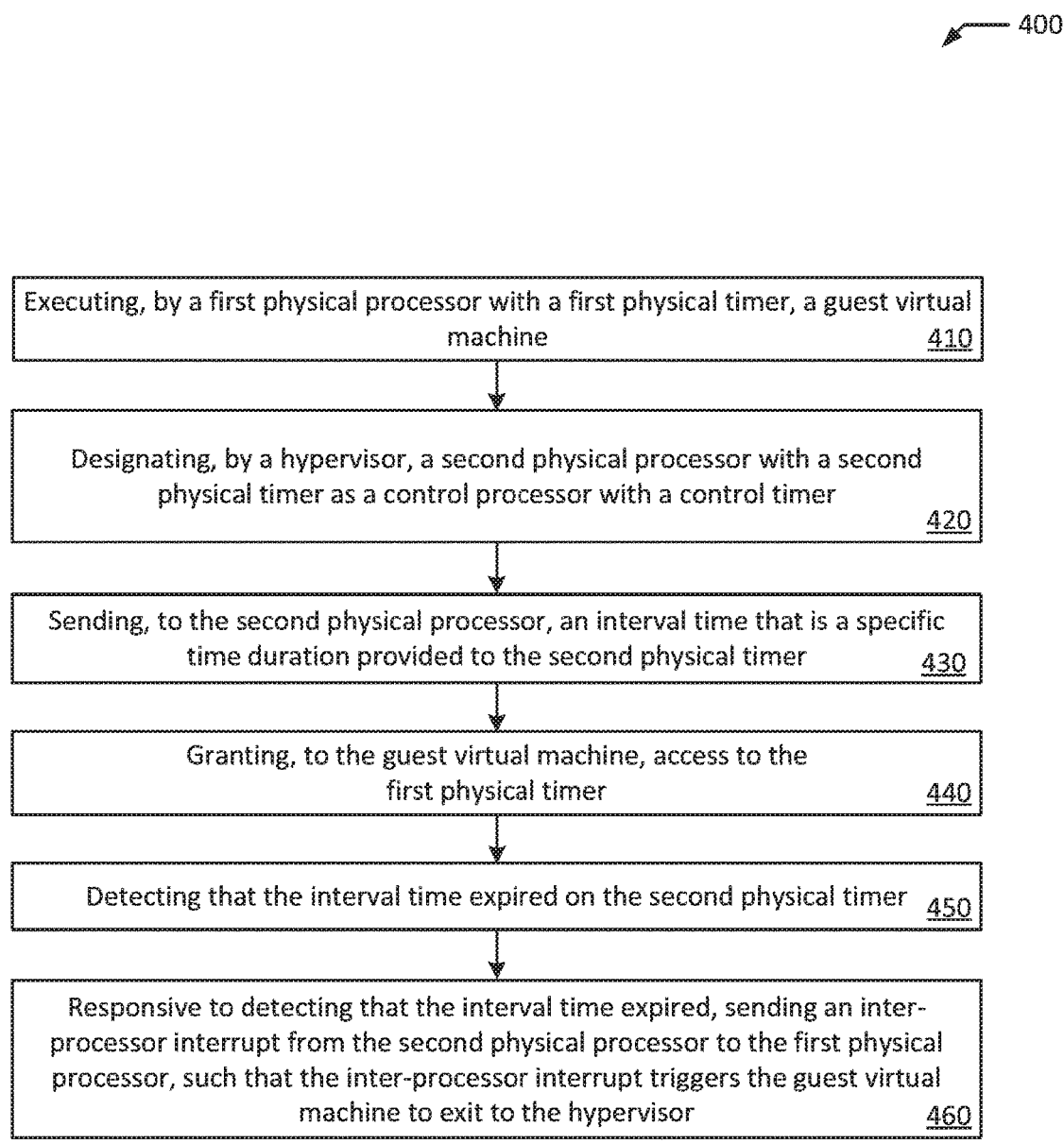
FIG. 4 is a flowchart illustrating an example method of scheduling timer access according to an example embodiment of the present disclosure.

FIG. 4 is a flowchart illustrating an example method of scheduling timer access according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. In an example embodiment, the method is performed by a hypervisor 180 interacting with processors 120A-B and guest virtual machine 170A.

The example method 400 starts with a first physical processor, which has a first physical timer, executing a first guest virtual machine (block 410). A typical configuration of first guest virtual machine (e.g., VM 170A) is described above with reference to FIG. 1. The example method 400 further includes designating, by a hypervisor, a second physical processor with a second physical timer as the control processor with a control timer (block 420). For example, when the interrupt time is determined to be 200 milliseconds, and the threshold time is 100 milliseconds, the hypervisor 180 may designate the physical processor 120B with the control timer 162 as the control processor. The example method 400 further includes sending, to the second physical processor, an interval time (block 430). For example, the interval time is a specific time duration, such as 150 milliseconds, provided to the second physical timer.

The example method 400 further includes granting, to the first guest virtual machine, access to the first physical timer (block 440). For example, the guest virtual machine 170A is granted access to the physical processor 120A and physical timer 160. The example method 400 further includes detecting that the interval time expired on the second physical timer (block 450). In an example embodiment, prior to the interval time 205 expiring on the second physical timer 162, the first guest virtual machine 170A has access to perform computing functions on the first physical processor 120A and/or the first physical timer 160.

Responsive to detecting that the interval time expired, the example method 400 further includes sending an inter-processor interrupt from the second physical processor to the first physical processor, such that the inter-processor interrupt triggers the first guest virtual machine to exit to the hypervisor (block 460). In an example embodiment, method 400 further includes, responsive to sending the inter-processor interrupt, recording, by the hypervisor, that the second physical processor is no longer designated as the control processor. By exiting to the hypervisor, the first guest virtual machine no longer has access to perform computing functions on the first physical processor and/or the first physical timer.

Figure 5:
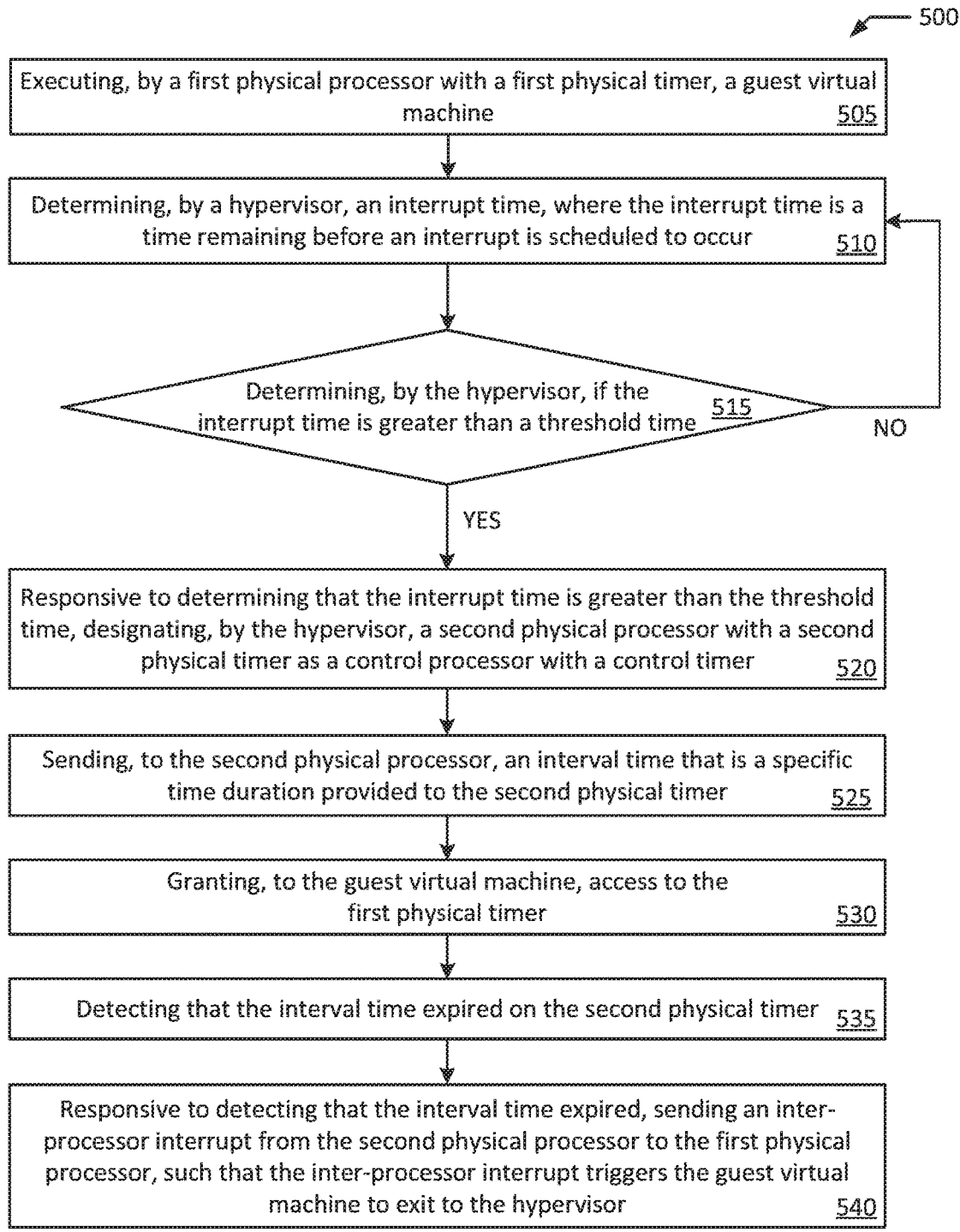
FIG. 5 is a flowchart illustrating an example method of scheduling timer access according to an example embodiment of the present disclosure.

FIG. 5 is a flowchart illustrating an example method of scheduling timer access according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both. In an example embodiment, the method is performed by a hypervisor 180 interacting with processors 120A-B and guest virtual machine 170A.

The example method 500 starts with a first physical processor, which has a first physical timer, executing a first guest virtual machine (block 505). A typical configuration of first guest virtual machine (e.g., VM 170A) is described above with reference to FIG. 1. The example method 500 further includes determining, by a hypervisor, an interrupt time (block 510). For example, the interrupt time is the time remaining before an interrupt is scheduled to occur to run CPU housekeeping tasks that are scheduled once per second. In an example where CPU housekeeping tasks are scheduled once per second, at any given moment, the interrupt time might be, for example, 900 milliseconds, 500 milliseconds, 100 milliseconds, 50 milliseconds, etc. The example method 500 further includes determining, by the hypervisor, if the interrupt time is greater than a threshold time (block 515). For example, the threshold time may be 250 milliseconds, 100 milliseconds, 50 milliseconds, etc.

Responsive to determining that the interrupt time is less than the threshold time, the example method 500 may recursively determine the interrupt time (block 510). For example, the example method 500 will continue to determine interrupt time (block 510) and determine if the interrupt time is greater than the threshold time (block 515) in a recursive fashion, until the interrupt time is greater than the threshold time.

Responsive to determining that the interrupt time is greater than the threshold time, the example method 500 further includes designating, by the hypervisor, a second physical processor with a second physical timer as the control processor with a control timer (block 520). For example, when the interrupt time is determined to be 200 milliseconds, and the threshold time is 100 milliseconds, the hypervisor 180 may designate the physical processor 120B with the control timer 162 as the control processor. The example method 500 further includes sending, to the second physical processor, an interval time (block 525). For example, the interval time is a specific time duration, such as 150 milliseconds, provided to the second physical timer.

The example method 500 further includes granting, to the first guest virtual machine, access to the first physical timer (block 530). For example, the guest virtual machine 170A is granted access to the physical processor 120A and physical timer 160. The example method 500 further includes detecting that the interval time expired on the second physical timer (block 535). In an example embodiment, prior to the interval time 205 expiring on the second physical timer 162, the first guest virtual machine 170A has access to perform computing functions on the first physical processor 120A and/or the first physical timer 160.

Responsive to detecting that the interval time expired, the example method 500 further includes sending an inter-processor interrupt from the second physical processor to the first physical processor, such that the inter-processor interrupt triggers the first guest virtual machine to exit to the hypervisor (block 540). In an example embodiment, method 500 further includes, responsive to sending the inter-processor interrupt, recording, by the hypervisor, that the second physical processor is no longer designated as the control processor. By exiting to the hypervisor, the first guest virtual machine no longer has access to perform computing functions on the first physical processor and/or the first physical timer.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of scheduling timer access, the method comprising:
executing, by a first physical processor with a first physical timer, a first guest virtual machine;
designating, by a hypervisor, a second physical processor as a control processor with a second physical timer as a control timer;
sending, to the second physical processor, an interval time that is a specific time duration provided to the second physical timer;
granting, to the first guest virtual machine, access to the first physical timer, such that the first guest virtual machine performs computing functions while using the first physical timer while the second physical timer is simultaneously serving as the control timer;

while the first guest virtual machine has access to the first physical timer, detecting that the interval time expired on the second physical timer; and responsive to detecting that the interval time expired, sending an inter-processor interrupt from the second physical processor to the first physical processor, such that the inter-processor interrupt triggers the first guest virtual machine to exit to the hypervisor.

2. The method of claim 1, further comprising determining, by the hypervisor, an interrupt time, wherein the interrupt time is a time remaining before an interrupt is scheduled to occur.

3. The method of claim 2, further comprising determining, by the hypervisor, that the interrupt time is greater than a threshold time, wherein, responsive to determining that the interrupt time is greater than the threshold, the hypervisor designates the second physical processor with the second physical timer as the control processor with the control timer.

4. The method of claim 1, further comprising recording, by the hypervisor, that the second physical processor is designated as the control processor.

5. The method of claim 4, further comprising, responsive to sending the inter-processor interrupt, recording, by the hypervisor, that the second physical processor is no longer designated as the control processor.

6. The method of claim 4, wherein a flag is used to record that the second physical processor is designated as the control processor.

7. The method of claim 1, further comprising, responsive to receiving the inter-processor interrupt from the second physical processor at the first physical processor, determining whether access to the first physical timer was granted to the first guest virtual machine when the inter-processor interrupt was received.

8. The method of claim 7, further comprising, responsive to determining that access to the first physical timer was granted to the first guest virtual machine when the inter-processor interrupt was received, loading a state of the first physical timer into a first virtual timer on the first guest virtual machine.

9. The method of claim 1, wherein an initial state of the first physical timer is loaded, onto the first physical timer, from a first virtual timer on the first guest virtual machine.

10. The method of claim 2, wherein the interrupt time is a scheduled time associated with hypervisor maintenance.

11. The method of claim 2, wherein the interrupt time is a scheduled time associated with a different second guest virtual machine requiring access to the first physical processor.

12. A system of scheduling timer access, the system comprising:
a first physical processor, wherein the first physical processor includes a first physical timer;
a second physical processor, wherein the second physical processor includes a second physical timer;
a first guest virtual machine, configured to be executed by the first physical processor; and
a hypervisor, configured to:
designate the second physical processor as a control processor and the second physical timer as a control timer;
send, to the second physical processor, an interval time that is a specific time duration provided to the second physical timer;
grant, to the first guest virtual machine, access to the first physical timer, such that the first guest virtual machine performs computing functions while using the first physical timer while the second physical timer is simultaneously serving as the control timer; and
while the first guest virtual machine has access to the first physical timer, detect that the interval time expired on the second physical timer, such that,
responsive to detecting that the interval time expired, the second physical processor sends an inter-processor interrupt to the first physical processor, such that the inter-processor interrupt triggers the first guest virtual machine to exit to the hypervisor.

13. The system of claim 12, wherein the hypervisor is further configured to determine an interrupt time, wherein the interrupt time is a time remaining before an interrupt is scheduled to occur.

14. The system of claim 13, wherein the hypervisor is further configured to determine that the interrupt time is greater than a threshold time, wherein, responsive to determining that the interrupt time is greater than the threshold time, the hypervisor designates the second physical processor with the second physical timer as the control processor with the control timer.

15. The system of claim 12, wherein designating the second physical processor as the control processor reduces virtualization overhead.

16. The system of claim 13, wherein the interrupt time is a scheduled time associated with a different second guest virtual machine requiring access to the first physical processor.

17. The system of claim 12, wherein the first physical timer is one of a low-precision timer and a high-precision timer.

18. A computer-readable non-transitory storage medium comprising executable instructions that, when executed, are configured to cause a hypervisor to:
designate the second physical processor as a control processor and the second physical timer as a control timer;
send, to the second physical processor, an interval time that is a specific time duration provided to the second physical timer;
grant, to a first guest virtual machine, access to a first physical timer, wherein the first physical timer is on a first physical processor, such that the first guest virtual machine performs computing functions while using the first physical timer while the second physical timer is simultaneously serving as the control timer; and
while the first guest virtual machine has access to the first physical timer, detect that the interval time expired on the second physical timer, such that,
responsive to detecting that the interval time expired, the second physical processor sends an inter-processor interrupt to the first physical processor, such that the inter-processor interrupt triggers the first guest virtual machine to exit to the hypervisor.

19. The computer-readable non-transitory storage medium of claim 18, wherein the hypervisor is further configured to determine an interrupt time, wherein the interrupt time is a time remaining before an interrupt is scheduled to occur.

20. The computer-readable non-transitory storage medium of claim 19, wherein the hypervisor is further configured to determine that the interrupt time is greater than a threshold time, wherein, responsive to determining that the interrupt time is greater than the threshold time, the hypervisor designates the second physical processor with the second physical timer as the control processor with the control timer.

* * * * *